US006052784A

United States Patent [19]
Day

[11] Patent Number: 6,052,784
[45] Date of Patent: Apr. 18, 2000

[54] NETWORK DISCOVERY SYSTEM AND METHOD

[75] Inventor: Michael David Day, American Fork, Utah

[73] Assignee: Intel Corporation, Santa Clara, Calif.

[21] Appl. No.: 08/949,733

[22] Filed: Oct. 14, 1997

[51] Int. Cl.[7] .............................. G06F 11/00; H04L 9/00
[52] U.S. Cl. ............................................. 713/201; 380/23
[58] Field of Search ................................ 713/201, 200, 713/202; 380/1, 4, 9, 19, 21, 23, 24, 25, 28, 29, 30, 42, 43, 45, 49; 714/182.02, 182.16, 183.03, 184.01, 185.1; 709/224, 225; 710/200; 707/9

[56] References Cited

U.S. PATENT DOCUMENTS

| | | | |
|---|---|---|---|
| 5,265,164 | 11/1993 | Matyas et al. | 380/30 |
| 5,511,122 | 4/1996 | Atkinson | 380/25 |
| 5,535,276 | 7/1996 | Ganesan | 380/25 |
| 5,594,869 | 1/1997 | Hawe et al. | 395/200.2 |
| 5,651,068 | 7/1997 | Klemba et al. | 380/25 |
| 5,659,616 | 8/1997 | Sudia | 380/23 |
| 5,671,279 | 9/1997 | Elgamal | 380/23 |
| 5,689,565 | 11/1997 | Spies et al. | 380/25 |
| 5,737,419 | 4/1998 | Ganesan | 380/21 |
| 5,745,574 | 4/1998 | Muftic | 380/23 |
| 5,799,086 | 8/1998 | Sudia | 380/23 |
| 5,805,712 | 9/1998 | Davis | 380/50 |
| 5,822,434 | 10/1998 | Caronni et al. | 380/49 |
| 5,850,442 | 12/1998 | Muftic | 380/21 |
| 5,872,848 | 2/1999 | Romney et al. | 380/25 |
| 5,872,849 | 2/1999 | Sudia | 380/49 |

OTHER PUBLICATIONS

Bellovin et al., Encrypted key exchange: Password–based protocols secure against dictionary attacks, IEEE Trans. on computer security, pp. 72–84, Jan. 1992.

Carl H. Meyer, A state of the art review, IEEE Trans. on computer security, pp. 4–150, 4–154, May 1989.

Fred Piper, Encryption, European conference on security and detection, pp. 61–65, Apr. 1997.

V. Varadharajan, Design of a network security policy model, UK IT 1990 Conference, pp. 38–45, Jun. 1990.

Case, J., et al., RFC1157, A Simple Network Management Protocol (SNMP), May 1990.

Davin, J., et al., RFC1351, "SNMP Administrative Model," Jul. 1992.

Galvin, J., et al., RFC1352, "SNMP Security Protocols," Jul. 1992.

McCloghrie, K., et al., RFC1353, "Definitions of Managed Objects for Administration of SNMP Parties," Jul. 1992.

Oppen, Derek C., et al., "The Clearinghouse: A Decentralized Agent for Locating Named Objects in a Distributed Environmental," *The Clearinghouse*, Oct. 1981, pp. 1–58.

Veizades, J., et al., RFC2165, "Service Location Protocol," Jun. 1997.

*Primary Examiner*—Robert W. Beausoliel, Jr.
*Assistant Examiner*—Nadeem Iqbal
*Attorney, Agent, or Firm*—Kenyon & Kenyon

[57] ABSTRACT

A system and method for the discovery of information from a second resource by a first resource through a network using authentication. A discovery request message is received at the second resource. The discovery request message includes discovery request data. If the second resource determines that the discovery request data is authentic, the second resource sends a discovery response message to the first resource through the network. The discovery response message includes authenticated discovery response data. Authentication provides assurance that the purported source of authenticated data is the true source, and protects the integrity of the authenticated data.

25 Claims, 4 Drawing Sheets

NETWORK DISCOVERY SYSTEM AND METHOD

BACKGROUND OF THE INVENTION

The field of this invention is network management, and in particular the discovery of information about network resources. A first network resource must often discover the existence and/or status of a second network resource in order to carry out a desired function. For example, if an application at the first resource desires to print a document at a printer close to a given geographical location, the first resource must discover if there is a printer (the second resource) near the location that is available and capable of printing the document.

In certain instances, information regarding the status and even the existence of a resource can be sensitive. For example, a database server can access several different databases, some of which are public, and some of which are private. In this example, one such public database is an index (or "white pages") of e-mail addresses of bank employees. A private database accessed through the same server contains customer credit card numbers and profiles.

In a known discovery system, a first resource sends a discovery request to the database server for a list of all databases that may be accessed through the server. In response, the server sends a complete list of such databases, including both public and private databases, to the requesting first resource as part of a discovery response message. This disadvantageously reveals the existence of the private credit card database, thus rendering it a target. In some instances, it can also reveal location and status information about the database that can disadvantageously aid an unauthorized party seeking unauthorized access to the database. An example of a known discovery system is disclosed in the proposed standard RFC (Request for Comments) 2165, Service Location Protocol, June 1997.

Known discovery systems disadvantageously fail to discriminate between authorized and unauthorized requesters of discovery information, and do not adequately protect the confidentiality or the integrity of discovery messages. As used herein a "discovery message" is a discovery request message or a discovery response message. As a result, known discovery systems are vulnerable to "spoofing." Spoofing occurs when a third party intentionally or accidentally sends a message whose purported source is not the actual source of the message. For example, a message purporting to originate from a customer is sent by an unauthorized party to the credit card database server authorizing the bank to send the customer's credit card number and profile to a third party, the unauthorized party. The credit agency that sends the report to the unauthorized party has been spoofed.

The discovery messages of known discovery systems are also disadvantageously vulnerable to compromise. Compromise occurs when any aspect of a message is modified or accessed in an unauthorized fashion. For example, if a customer's credit card balance is altered by an unauthorized party without authorization from the customer or the bank, then the balance has been compromised. Likewise, if a discovery response message sent to a legitimate requester is intercepted and copied by an unauthorized party, the message has been compromised.

Known discovery systems provide inadequate assurance to the recipient of a discovery message that the message is authentic, i.e., that the purported source of the message is its true source. Likewise, known discovery systems provide insufficient basis for the recipient of a discovery message to reasonably conclude that the message has not been subjected to unauthorized modification. Finally, neither the sender nor the recipient of a discovery message can be certain that the message has not been disclosed to an unauthorized third party. Known discovery systems provide inadequate means for authenticating and protecting the integrity and confidentiality of discovery messages.

SUMMARY OF THE INVENTION

According to one embodiment of the present invention, a system and method are provided for providing information from a second resource to a first resource through a network. In one embodiment, a discovery request message that includes discovery request data is received at the second resource from the first resource. It is determined at the second resource if at least part of the discovery request message is authentic. If the discovery request data is determined to be authentic, then the discovery request data is processed.

Figure 1A:
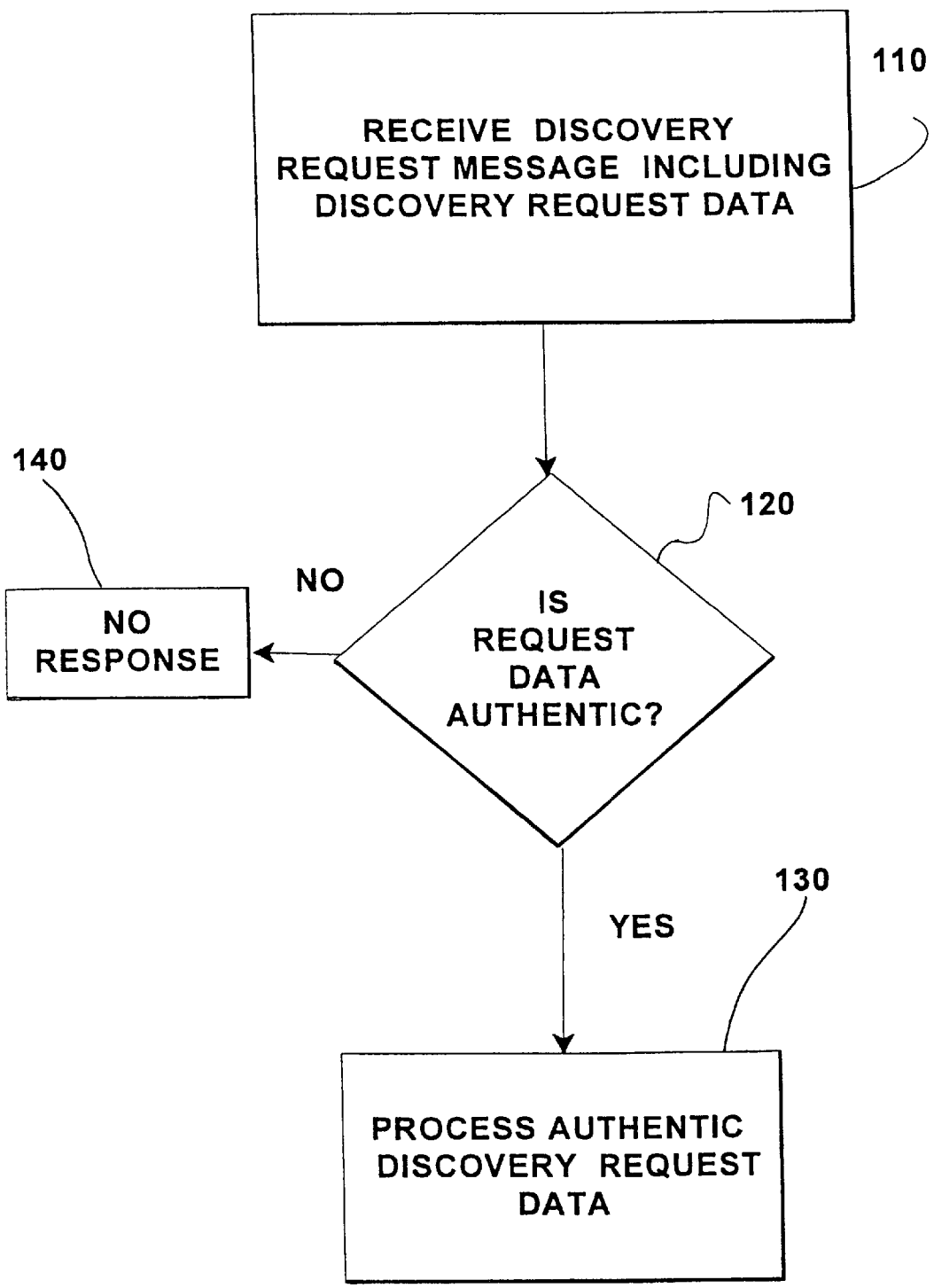
FIG. 1A is a flow chart illustrating a first embodiment of the method in accordance with the present invention.
Figure 1B:
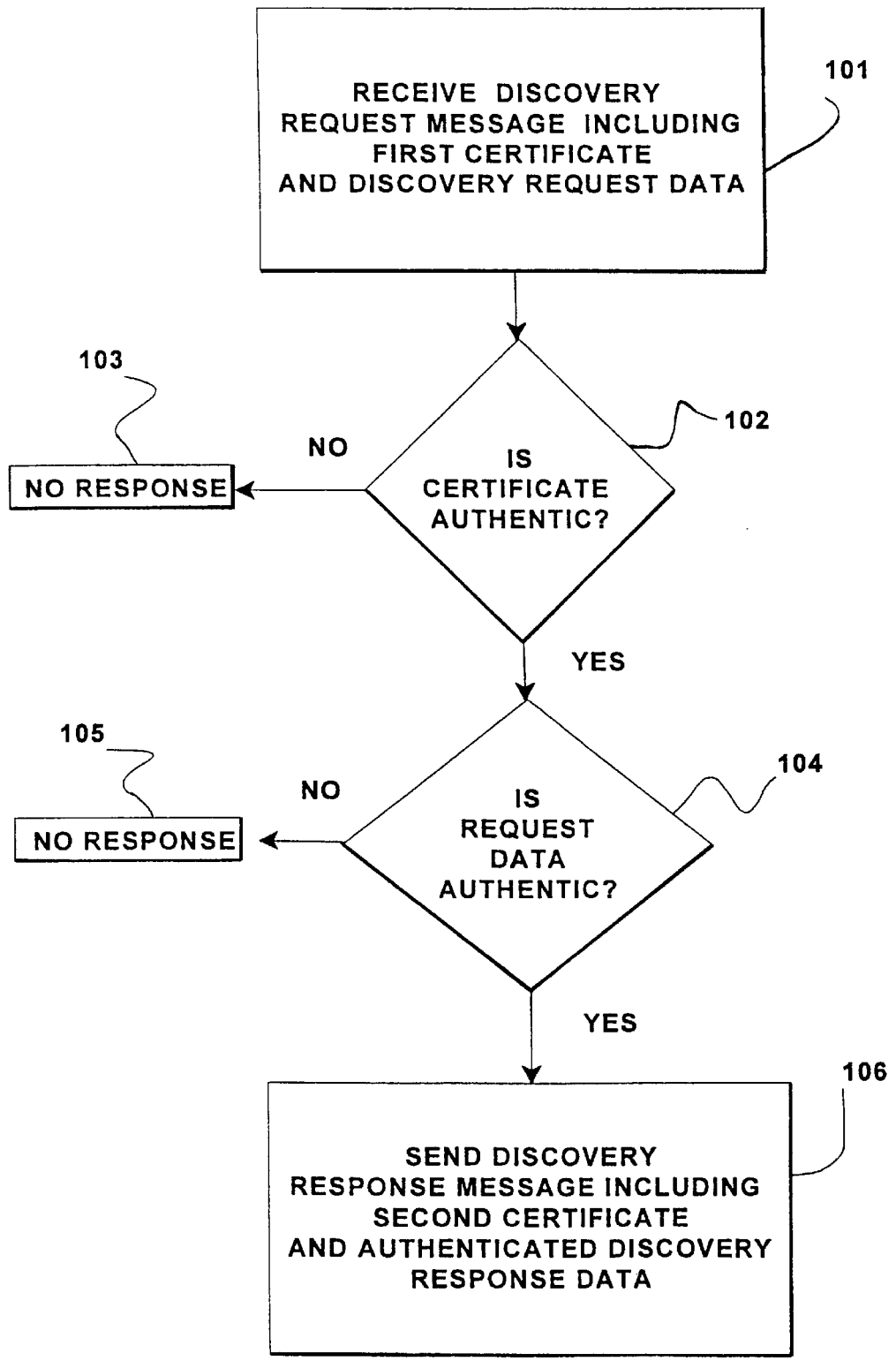
FIG. 1B is a flow chart illustrating a second embodiment of the method in accordance with the present invention.
Figure 2:
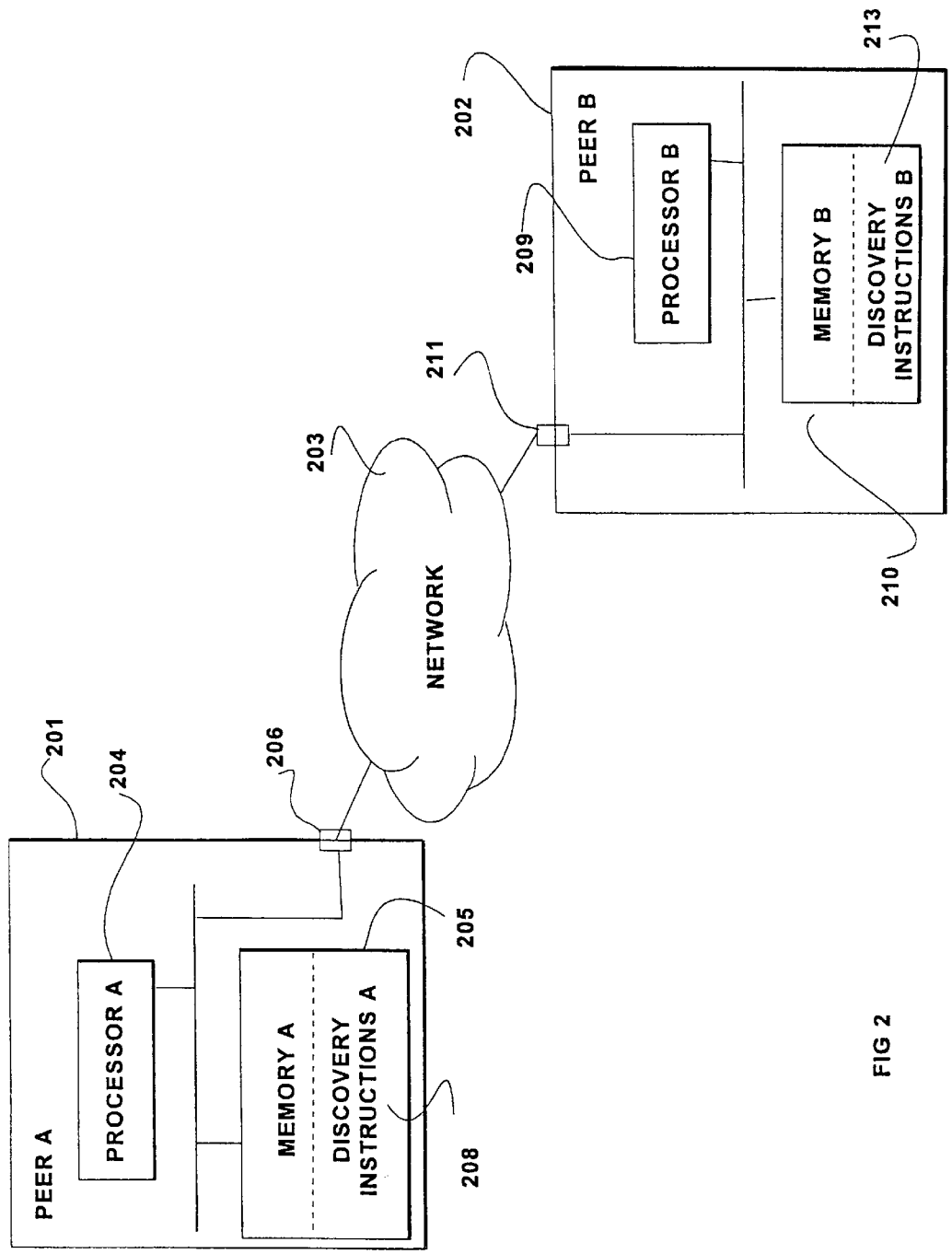
FIG. 2 illustrates a first embodiment of an apparatus and system used in accordance with the present invention.

The "first embodiment" of the method shown in FIG. 1A may, but need not be, implemented by the "first embodiment" of the apparatus and system shown in FIG. 2. The "second embodiment" of the method shown in FIG. 1B may, but need not be, implemented by the "second embodiment" of the apparatus and system shown in FIG. 3.

DETAILED DESCRIPTION

FIG. 1A shows an embodiment of a method in accordance with the present invention. A second network resource receives a discovery request message including discovery request data, step 110. As used herein, a resource is a device capable of sending and/or receiving a discovery message and is adapted to be connected to a network. A discovery message is a discovery request message or a discovery response message. The second resource determines if the discovery request data is authentic, step 120. If the discovery request data is authentic, then the second resource processes the discovery request data, step 130. If the discovery request data is determined not to be authentic, then the second resource determines that the discovery request data is invalid, and provides no response to the discovery request message, step 140. In one embodiment of the present invention, the second resource processes the authentic data request message by sending a data response message to the first resource. In one embodiment, the data response message includes discovery response data that is authenticated by the first resource. In another embodiment of the present invention, the second resource processes the authentic data request message by sending an ancillary message to a third resource connected to the network. In one embodiment, the ancillary message is authenticated by the second resource. In another embodiment, the ancillary message is encrypted by the second resource.

FIG. 1B shows another embodiment of a method in accordance with the present invention. A second network resource receives a discovery request message from a first network resource, step 101. As shown in FIG. 1, the discovery request message includes a first certificate and discovery request data. In one embodiment of the present invention, the first certificate includes an authenticated public asymmetric cryptographic key belonging to the first resource. Public and private asymmetric cryptographic keys are used in accordance with the present invention with public key encryption schemes as are known in the art.

In a public key encryption scheme, cryptographic keys occur in pairs: one of the pair is a private key that is kept confidential, and the other of the pair is a public key that can be made available to anyone. When data is encrypted using one of the keys (either the public key or the private key), the other key must be used to decrypt the data. For example, resource A encrypts data using a private asymmetric cryptographic key belonging to A. Resource A makes the corresponding public asymmetric cryptographic key available publicly. The only key that can properly decrypt the data is the public key corresponding to the private key with which the data was encrypted. When resource B receives the data, it uses resource A's public key to decrypt the data. If the data decrypts properly, resource B is certain that only resource A, the sole holder of the corresponding private key, could have encrypted the data. In this way, resource B knows that the data must have originated from resource A, i.e., that the data purportedly from resource A is authentic.

In another embodiment of the present invention, the first certificate is sent from the first resource to the second resource in a separate message than the message that includes the discovery request data.

As used herein, the term "authenticate" means to impart or evaluate authentication information to or in data. Authentication information is useful for determining if the purported source of data is the true source. In accordance with an embodiment of the present invention, when data with no authentication information is received, a default action is taken. In one embodiment of the present invention, the default action is to determine that the data is not authentic and send no response. In another embodiment of the present invention, the message is forwarded to another resource connected to the network for further processing.

In one embodiment of the present invention, the authenticity of the first certificate is established with the assistance of a trusted third party certification authority. A first certificate is created when the first resource selects a first nonce and submits it to the certification authority. A nonce is a data element that for practical purposes is used only once in any given context. In one embodiment of the present invention, a nonce is a random number. The certification authority signs the first nonce with a private asymmetric cryptographic key belonging to the certification authority to produce an authenticated first certificate that is returned to the first resource. In accordance with this embodiment of the present invention, the first nonce along with the first nonce signature data (the authentication information) comprise the first certificate.

In one embodiment, the discovery request data is authenticated by cryptographically signing it at the first resource using a private asymmetric cryptographic key belonging to the first resource, in known fashion. Discovery request data can pertain to the location, status, address and/or communication protocol of a network resource, or data stored at a network resource.

In another embodiment of the present invention, the discovery request message further comprises a time-to-live value. In one embodiment, the time-to-live value is absolute, and specifies a date and time after which the first certificate is invalid. An example of this type of time-to-live value is Sep. 29, 1997:13:27:45. Thus, the first certificate will no longer be valid after one o'clock p.m., twenty seven minutes and forty five seconds on Sep. 29, 1997.

In another embodiment, the time-to-live value is relative and specifies a time which begins to elapse when the first certificate is received. The first certificate is invalid after the time-to-live has elapsed. An example of a relative time-to-live value is 172800 seconds. Thus, the first certificate will no longer be valid two days after it is received. In one embodiment of the present invention, the time-to-live value is authenticated.

In another embodiment, the discovery request message further comprises at least one flag containing control information. In one embodiment, such control information includes response configuration information. For example, a control flag with a value of 33 indicates that the discovery response message is to be sent using a particular protocol and formatted such that a certificate follows any response data. In one embodiment of the present invention, the flag is authenticated.

In accordance with one embodiment of the present invention, the authenticity of the certificate in the received discovery request message is determined by the second resource, step 102. In one embodiment of the present invention, the authenticity of the first certificate is determined in known fashion using the public asymmetric cryptographic key belonging to the certification authority and corresponds to the private key used by the certification authority to sign the first nonce.

If the first certificate is determined not to be authentic, then no response is sent to the requesting first resource, step 103. This advantageously prevents any further sharing of information with an unauthorized resource, either through open or covert channels.

If the first certificate is determined to be authentic, then the authenticity of the discovery request data is determined by the second resource, step 104. In one embodiment of the present invention, the authenticity of the discovery request data is determined in known fashion using the public asymmetric cryptographic key belonging to the first resource that corresponds to the private key used by the first resource to sign the discovery request data.

If the discovery request message is determined not to be authentic, then no response is sent to the requesting first resource, step 105. This advantageously prevents any further sharing of information with an unauthorized resource, either through open or covert channels. In accordance with one embodiment of the present invention, the authenticity of a time-to-live value and/or flag is also determined.

If the discovery request message is determined to be authentic, then the second resource sends a discovery response message to the first resource, step 106. As shown in FIG. 1B, the discovery response message can comprise a second certificate and authenticated discovery response data. Discovery response data can include information such as the location, status, address and communication protocol of a network resource; data stored at a network resource; applications and application interface data; and/or any information whose authenticity and/or integrity should be protected.

In one embodiment of the present invention where the discovery response data must be kept private, the discovery response data is encrypted. In one embodiment, the response data is encrypted at the second resource in known fashion using a public asymmetric cryptographic key belonging to the first resource. A recipient of encrypted data decrypts the encrypted data in order to restore the data to its original form before it was encrypted.

In accordance with the present invention, either or both of the time-to-live value and at least one control flag in the discovery request message can be authenticated. In accordance with one embodiment of the present invention, the authenticity of each such time-to-live value and/or control flag is determined. If any is determined not to be authentic, then no response is sent to the requester. If all are determined to be authentic, then a discovery response message can be sent to the requester.

An example of a discovery request message called PING in accordance with one embodiment of the present invention is as follows:

A→B PING(Cert$_A$, Sign$_A$(t,flag,req_data))

In this example, A is the first resource and B is the second resource. Cert$_A$ is the first certificate belonging to the first resource A. The value "t" is the time-to-live value for Cert$_A$, "flag" is the control flag, and "req_data" is the discovery request data. Sign$_A$(t,flag,req_data) indicates that t, flag and data are authenticated by the first resource, A.

In another embodiment of the present invention, the discovery response message further comprises a symmetric key that is authenticated and encrypted in known fashion. The symmetric key can advantageously be used to maintain the confidentiality of subsequent communications between the first and second resources. Symmetric key cryptographic algorithms are typically faster and more efficient than asymmetric key cryptographic algorithms, so the confidential transmission of an authentic symmetric key advantageously improves the efficiency and speed of subsequent confidential communications between the first and second resources.

In yet another embodiment, the discovery response message further comprises a time-to-live value for the second certificate. The time-to-live value can be authenticated and/or encrypted in accordance with the present invention.

In yet another embodiment, the discovery response message further comprises at least one flag containing control information. The flag can be signed and/or encrypted in accordance with the present invention.

An example of a discovery response message called PONG in accordance with one embodiment of the present invention is as follows:

B→A PONG(Cert$_B$, Encrypt$_A$(Sign$_B$(t,resp_data, symmetric_key))

In this example, B is the second resource and B is the first resource. Cert$_B$ is the second certificate belonging to the second resource B. The value "t" is the time-to-live value for Cert$_B$; "resp_data" is the discovery response data; and "symmetric_key" is a first symmetric key. Sign$_B$(t,resp_data,symmetric_key) indicates that t, resp_data and symmetric_key are authenticated by the second resource, B. Encrypt$_A$(Sign$_B$(t,resp_data,symmetric_key) indicates that the data authenticated by B is encrypted. In one embodiment, this encryption is performed by B using a public asymmetric cryptographic key belonging to A. In another embodiment, this encryption is performed by B using a second symmetric key that is shared between A and B.

The present invention can advantageously be carried out efficiently in a stateless environment. For example, one embodiment of the present invention is carried out using Internet Protocol, RFC 791, DARPA (Defense Advanced Research Projects Agency) Internet Program Protocol Specification, September 1981. Secure discovery is thus advantageously carried out without having to establish a session between two resources through a network. A session is a persistent connection between communicating resources on a network. This advantageously utilizes the efficiencies available through stateless communication, such as those provided by packet switching. Stateless communication does not require a persistent connection between communicating resources.

An apparatus and system in accordance with an embodiment of the present invention is shown in FIG. 2. Peer A 201 is connected to peer B 202 through network 203. As used herein, a peer is a computer with a network address. In one embodiment, a computer is a processor, a memory and a port adapted to be connected to a network, the memory and port coupled to the processor. An example of a processor is an Intel Pentium processor. Another example of a processor is a digital signal processor (DSP). Yet another example of a processor is an Application Specific Integrated Circuit (ASIC). In another embodiment, a computer is an ASIC, a memory and a port adapted to be connected to a network, the memory and port coupled to the ASIC. In one embodiment of the present invention, network 203 is the Internet. In another embodiment, network 203 is a local area network. In yet another embodiment, it is a wide area network. In yet another embodiment, network 203 is the public switched telephone network. Peer A comprises processor A 204, memory A 205, and port A 206 adapted to be connected to network 203. Memory A 205 and port A 206 are coupled to processor A 204. Memory A 205 stores a set of discovery instructions A 208 that are adapted to be executed by processor A 204 to send a discovery request message and receive a discovery response message in accordance with an embodiment of the present invention. In one embodiment, memory A 205 is random access memory (RAM). In another embodiment, memory A 205 comprises random access memory and a hard disk drive. In yet another embodiment, memory A 205 comprises read only memory (ROM) and random access memory.

Peer B 202 comprises processor B 209, memory B 210, and port B 211. Memory B 210 and port B 211 are coupled to processor B 209. Memory B 210 stores a set of discovery instructions B 213 that are adapted to be executed by processor B 209 to receive a discovery request message and send a discovery response message in accordance with the present invention. In one embodiment, memory B 210 is random access memory. In another embodiment, memory B 210 comprises random access memory and a hard disk drive. In yet another embodiment, memory B 210 comprises random access memory and a floppy disk in a floppy disk drive.

In accordance with the present invention, peer B 202 receives a discovery request message sent from peer A 201 through network 203, and determines the authenticity of at least part of the discovery request message. If at least part of the discovery request message is authentic, then peer B 202 sends a discovery response message through network 203 to peer A 201.

Figure 3:
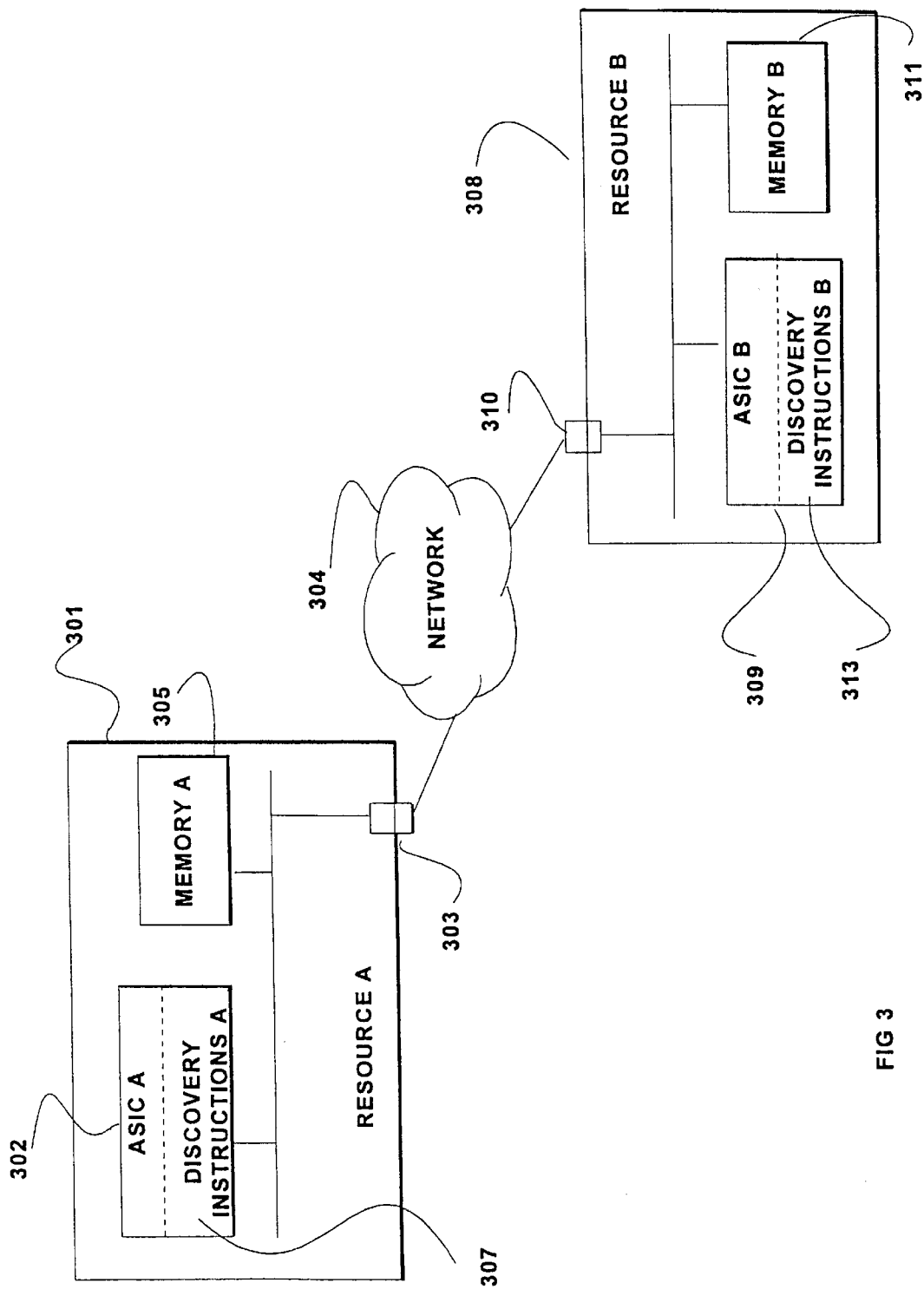
FIG. 3 illustrates a second embodiment of an apparatus and system in accordance with the present invention.

Yet another embodiment of the present invention is shown in FIG. 3. Resource A 301 comprises Application Specific Integrated Circuit (ASIC) A 302, port A 303 to be connected to a network 304, and memory A 305. Memory A 305 and port A 303 are coupled to ASIC A 302. ASIC A 302 embodies an electronically fixed set of discovery instructions 307 that are adapted to be performed by ASIC A 302 to send a discovery request message and receive a discovery response message in accordance with the present invention.

Resource B 308 comprises Application Specific Integrated Circuit (ASIC) B 309, port B 310 to be connected to network 304, and computer readable memory B 311. Memory B 311 and port B 310 are coupled to ASIC B 309. ASIC B 309 embodies an electronically fixed set of instructions B 313 that are adapted to be carried out by ASIC B 309 to receive a discovery request message and send a discovery response message in accordance with the present invention.

In one embodiment of the present invention, instructions adapted to be executed by a processor to carry out the present invention are fixed to a medium and distributed to resources on a network. In one embodiment, the medium is a floppy disk. In another embodiment, the medium is a compact disc-read only memory (CD-ROM.) In yet another embodiment, the medium is random access memory (RAM) and/or read only memory (ROM) resident on a smart card.

In yet another embodiment of the present invention, computer readable instructions adapted to be executed by a processor to carry out the present invention are distributed electronically from one resource to another resource through a network.

The present invention advantageously provides an efficient stateless datagram-based system and method for secure discovery that adequately ensures the authenticity of discovery messages while protecting their integrity and confidentiality.

Although several embodiments are specifically illustrated and described herein, it will be appreciated that modifications and variations of the present invention are covered by the above teachings and are within the purview of the appended claims without departing from the spirit and intended scope of the invention.

What is claimed is:

1. A method for providing information about a second resource to a first resource through a network, comprising the steps of:
   a. receiving at the second resource a discovery request message from the first resource, said discovery request message comprising discovery request data that at least partly specifies information about the second resource requested by the first resource;
   b. determining if at least part of the discovery request message is authentic at the second resource; and
   c. if the discovery request data is determined to be authentic, then processing the discovery request data.

2. The method of claim 1, wherein determining if at least part of the discovery request message is authentic includes the step of determining if the discovery request data is authentic.

3. The method of claim 1, wherein processing the discovery request data includes the step of sending a discovery response message from the second resource to the first resource.

4. The method of claim 1, further comprising the step of receiving a first certificate at the second resource from the first resource, and wherein processing the discovery request message comprises the steps of:
   a. determining if the first certificate is authentic; and
   b. if the first certificate is authentic, then sending a discovery response message from the second resource to the first resource.

5. The method of claim 1, wherein the discovery request message further comprises a time-to-live value for the first certificate.

6. The method of claim 1, wherein the discovery request message further comprises at least one flag that includes control information.

7. The method of claim 1, wherein the discovery request data is authenticated by cryptographically signing the discovery request data at the first network resource using a private asymmetric cryptographic key belonging to the first network resource.

8. The method of claim 3, wherein the discovery response message comprises authenticated discovery response data.

9. The method of claim 1, wherein processing the discovery request data comprises the step of sending a second certificate from the second resource to the first resource.

10. The method of claim 8, wherein the discovery response data is authenticated by cryptographically signing the discovery response data at the second network resource using a private asymmetric cryptographic key belonging to the second network resource.

11. The method of claim 8, wherein the discovery response data is encrypted at the second network resource using a public asymmetric cryptographic key belonging to said first network resource.

12. The method of claim 3, wherein the discovery response message further comprises an encrypted symmetric cryptographic key.

13. The method of claim 3, wherein the discovery response message further comprises an authenticated symmetric cryptographic key.

14. The method of claim 9, wherein the discovery response message further comprises a time-to-live value for the second certificate.

15. The method of claim 4, further comprising the step of caching the first certificate at the second network resource.

16. An apparatus for discovering information about a resource over a network, comprising:
   a. a processor;
   b. a memory storing discovery instructions adapted to be executed by said processor to send and receive a discovery message and to authenticate at least a portion thereof, said discovery message including at least one of: a request for information about a resource coupled to the network, and information about a resource coupled to the network; and
   c. a port to be connected to the network and through which discovery messages are sent and received, said memory and said port coupled to said processor.

17. The apparatus of claim 16, wherein said discovery instructions are executed by said processor to encrypt and decrypt at least part of a discovery message.

18. A medium that stores discovery instructions adapted to be executed by a processor to perform the steps of:
   a. receiving a first discovery message that includes a request for information about a resource coupled to the network;
   b. determining the authenticity of at least part of the first discovery message;
   c. authenticating data about the resource that is responsive to the first discovery message; and
   d. sending a second discovery message that includes the authenticated data that is responsive to the first discovery message.

19. The medium of claim 18, wherein the first discovery message includes discovery request data that at least partly specifies the information that is requested about the resource, and wherein said discovery instructions are adapted to be executed by a processor to perform the step of determining if the discovery request data is authentic.

20. The medium of claim 18, wherein said discovery instructions are adapted to be executed by a processor to perform the steps of authenticating discovery response data to be included in said second discovery message.

21. The medium of claim 18, wherein said discovery instructions are adapted to be executed by a processor to perform the step of receiving a first certificate.

22. The medium of claim 21, wherein said discovery instructions are adapted to be executed by a processor to perform the step of determining if the first certificate is authentic.

23. The medium of claim 18, wherein said discovery instructions are adapted to be executed by a processor to perform the step of sending a second certificate.

24. The medium of claim 18, wherein said discovery instructions are adapted to be executed by a processor to perform the step of encrypting at least part of a discovery request message.

25. The medium of claim 18, wherein said discovery instructions are adapted to be executed by a processor to perform the step of decrypting at least part of a discovery request message.

* * * * *